(12) United States Patent
Shaltiel et al.

(10) Patent No.: US 9,027,888 B2
(45) Date of Patent: May 12, 2015

(54) SYSTEM AND METHOD FOR MEASUREMENT OF ANGULAR ORIENTATION OF AEROSPACE PLATFORMS

(75) Inventors: Rabin Shaltiel, Holon (IL); Allan Kahane, Rehovot (IL)

(73) Assignee: Israel Aerospace Industries Ltd., Lod (IL)

( * ) Notice: Subject to any disclaimer, the term of this patent is extended or adjusted under 35 U.S.C. 154(b) by 306 days.

(21) Appl. No.: 13/814,530

(22) PCT Filed: Aug. 4, 2011

(86) PCT No.: PCT/IL2011/000631
§ 371 (c)(1),
(2), (4) Date: Apr. 15, 2013

(87) PCT Pub. No.: WO2012/020400
PCT Pub. Date: Feb. 16, 2012

(65) Prior Publication Data
US 2013/0192074 A1    Aug. 1, 2013

(30) Foreign Application Priority Data
Aug. 11, 2010  (IL) ........................................ 207536

(51) Int. Cl.
G01C 21/16    (2006.01)
G01C 21/08    (2006.01)

(52) U.S. Cl.
CPC ................ *G01C 21/16* (2013.01); *G01C 21/08* (2013.01)

(58) Field of Classification Search
CPC ................................ G01C 21/16; G01C 21/08
USPC ......... 33/303; 244/171, 167; 701/4, 500, 504; 73/167
See application file for complete search history.

(56) References Cited

U.S. PATENT DOCUMENTS

| | | | | |
|---|---|---|---|---|
| 3,227,397 | A * | 1/1966 | Good, Jr. et al. | 244/171 |
| 3,286,953 | A * | 11/1966 | Dryden | 244/171 |
| 3,540,678 | A * | 11/1970 | Bittner et al. | 244/3.2 |
| 4,071,211 | A * | 1/1978 | Muhlfelder et al. | 244/165 |
| 4,608,641 | A | 8/1986 | Snell | |
| 5,476,239 | A * | 12/1995 | Brainard | 244/171 |
| 5,738,309 | A * | 4/1998 | Fowell | 244/171 |
| 5,886,257 | A | 3/1999 | Gustafson et al. | |
| 6,289,268 | B1 * | 9/2001 | Didinsky et al. | 701/13 |
| 8,047,070 | B2 * | 11/2011 | Tyree | 73/167 |
| 8,519,313 | B2 * | 8/2013 | Geswender et al. | 244/3.2 |
| 2012/0104150 | A1 * | 5/2012 | Elgersma et al. | 244/3.21 |
| 2014/0158813 | A1 * | 6/2014 | De Picciotto | 244/3.2 |

* cited by examiner

*Primary Examiner* — Christopher Fulton
(74) *Attorney, Agent, or Firm* — Oliff PLC (57) ABSTRACT

A method and system are presented for use in determination of the orientation of an aerospace platform with respect to a first rotation axis. A direction of a rotation rate vector of said aerospace platform within a lateral plane intersecting with said first rotation axis is measured and the measured data is analyzed to determine an orientation angle of said aerospace platform about said first rotation axis. While the aerospace platform is in a predetermined-dynamic state movement, a certain direction is determined by measuring a direction of the rotation rate of the aerospace platform within said lateral plane by a sensor assembly mounted on said platform and including at least one rotation rate sensor. An orientation of the platform with respect to said first axis is determined by determining a relation between said certain direction and said known direction within said external reference frame.

20 Claims, 5 Drawing Sheets

SYSTEM AND METHOD FOR MEASUREMENT OF ANGULAR ORIENTATION OF AEROSPACE PLATFORMS

FIELD OF THE INVENTION

This invention relates to a method and a system for determining orientation of an aerospace platform.

BACKGROUND OF THE INVENTION

Angular measurements are required in a wide variety of aerospace platforms such as airplanes, missiles, satellites etc. Typically, measurement of the angular rotation rates of such aerospace platforms is carried out by Attitude Heading Reference Systems (AHRS) or Inertial Navigation Systems (INS) that utilize three orthogonal rotation rate sensors (e.g. rate gyros) which are adapted for measuring the rotation rates of the aerospace platform with respect to three rotation axes. Typically, three orthogonal rotation rate sensors are aligned along the roll, pitch and yaw rotation axes of the platform and are thus adapted for sensing the rotation rate of the platform with respect to these axes.

Generally, having a priori knowledge of the platform's orientation, the orientation of the platform during its movement may be monitored by integration of the platform's rotation rates measured by respective rotation rate sensors (gyros) along three rotation axes of the platform. However, the accuracy of systems that determine the platform's orientation based on the initial platform orientation, and on continuous sensing and integration of the platform's kinematics depends on the accuracy of the priory knowledge of the initial state and is generally deteriorating during the platform's motion. This is due to errors of which the existing rotation rate sensors suffer (called bias drift effect) that impair their measurement accuracy. In particular, when using integration of measured rotation rates over extensive periods of time to determine changes in the platform's angular position, the bias drift may accumulate to substantial bias measurement errors which require repeated bias corrections.

Various techniques for compensating or reducing bias measurement error have been suggested. One method is to minimize the amount of bias corrections required by utilizing highly accurate rate gyros exploiting technologies such as ring laser gyros or fiber optic gyros. These types of gyros typically have small bias drift rates which enable to obtain accurate orientation readings (i.e. by integrating the rotation rate measurements) for substantial periods of time without requiring any external bias correction. However, implementing an AHRS or INS with these types of rate gyros is extremely costly.

Less-costly rotation rate sensors (such as MEMS gyros), which have high bias drift rates, require frequent bias corrections in the form of information from other sources relating to aerospace platform orientation. AHRS or INS systems utilizing these types of lower accuracy rate sensors are typically hybrid systems combining inertial measurements that provide continuous data relating to the orientation of the platform (i.e. based on an integration of the measured platform's rotation rates taken from aboard the platform) with data received from other sources (on-board or remote) providing, occasionally, additional accurate data relating to the platform's orientation about the pitch and yaw axes. The actual platform orientation is typically determined by utilizing statistical filtering algorithms, such as the Kalman Filter, to combine continuous data measured by the on-board rotation rate sensors and occasional data received from the additional sources. The additional accurate data relating to the platforms orientation enables to determine the bias drift of the on-board pitch and yaw rotation rate sensors and/or to correct the bias error accumulated during integration of the rotation rate measurements. Such techniques are limited at least because they provide correction only to the measurement of the pitch and yaw rotation rates measurement, while not providing correction to the measured roll rotation rate.

For example, some existing AHRS and INS systems are integrated with external (e.g. remote from the platform) measurement facilities, such as GPS-based positioning systems, which are adapted to measure and provide to the platform, occasional data indicative of the platform's orientation and/or location. However, relying on remote systems, such as GPS-based systems, does not provide sufficient integrity for driving systems with catastrophic failure modes, such as an AHRS.

According to other known techniques, inertial rotation rate measurement systems are integrated with on-board direct measurement systems, such as global positioning systems (GPS), that enable to accurately determine, from time to time, the platform's orientation. For example, rate gyro integrations are used to compute a platform's orientation while parameters obtained from other sensors or from direct measurement of the platform's orientation are compared, from time to time, with the computed platform orientation to determine proper bias values of the three rate gyroscopes. This allows compensation of measurement errors that are introduced by the bias drifts of the sensors. It should be noted that in many cases, direct measurement to systems provide better results when they are utilized during low dynamic motion of the platform. Accordingly, in some cases, during high dynamic movement (maneuvering) of the aerospace platform, inertial rotation rate measurement systems as used to determine the orientation of the platform, while when the platform is in lower dynamic motion, the results from direct measurement systems are used to compensate bias drifts of the inertial rotation rate sensors (gyros).

Direct measurements of the orientation of the platform with respect to the pitch and yaw axes are relatively straightforward (e.g. for the pitch rate gyro, using measurements of the earth's magnetic flux provides a reliable and accurate method for determining bias of the pitch and yaw gyros). However, determining the bias of the roll rate gyro bias is not nearly so straightforward.

Many systems rely on a human operator for the provision of roll angle corrections during platform movement. The main disadvantages of this method are the need of the foreknowledge of the initial/intermediate roll angle which is often based on human judgment, which makes such systems cumbersome and susceptible to human error.

Other techniques for determining the roll angle of an aerospace platform are based on the measurements of the earth's magnetic field. An example of such a method is disclosed in U.S. Pat. No. 4,608,641. This patent describes an aircraft operating in a gravitation field and having conventional sensors for measuring true air speed, angles of incidence and yaw, rotation about x, y and z axes, and acceleration thereallong is provided with means for calculating the inertial component of the acceleration from data concerning the true air speed, heading and rotation of the aircraft obtained from the sensors, and means for comparing the inertial component with the total acceleration sensed, thereby to deduce the orientation of the gravitation component and hence obtain an estimate of the pitch and bank angles of the aircraft.

The above techniques, however, generally require accurate positioning information and determination of variations in the earth's magnetic field. Also, they have relatively poor accuracy in the vicinity of the earth's magnetic poles.

U.S. Pat. No. 4,608,641 discloses an aircraft operating in a gravitational field and having conventional sensors for measuring true air speed (sensors 10, 11), angles of incidence and yaw (sensors 13, 12), rotation about x, y and z axes and acceleration therealong (sensors 14, 15, 16) is provided with means for calculating the inertial component of the acceleration from data concerning the true air speed, heading and rotation of the aircraft obtained from the sensors, and means for comparing the inertial component with the total acceleration sensed, thereby to deduce the orientation of the gravitational component and hence obtain an estimate of the pitch and bank angles of the aircraft.

U.S. Pat. No. 5,886,257 discloses three rate gyros mounted to a ballistic body to provide an autonomous navigation system. A roll gyro, a yaw gyro and a pitch gyro are rigidly fixed to the ballistic body. Each gyro is arranged to be responsive to a roll rate about an input axis that is substantially orthogonal to any other gyro. The roll-rate gyro has its input axis aligned parallel to the body spin axis. An on-board processor utilizes recursive Kalman-filtering to determine the roll angle, i.e., the local vertical direction, from the gyro outputs.

GENERAL DESCRIPTION

A need exists for a highly reliable and simple technique to correct errors resulting from the bias drift of roll rate gyro which might be significant in systems of the type utilizing rate gyros having large bias drift rates (e.g. AHRS and INS).

As described above, while determining the biases of the pitch and the yaw rate gyros is relatively easy, determining the bias of a roll gyro is still challenging. The inventors of the present invention have found that in many situations during certain types of motions of an aerospace platform, the motion is a predetermined dynamic motion, namely being a motion characterized by certain measurable parameters, which are measurable from on board the platform, and which are indicative of the platform angular orientation with respect to at least one of its rotation axes and relative to an external reference frame.

In the present disclosure, the yaw, pitch, and roll rotation axes are used to designate the aerospace platform body axes. For clarity, the orientation of the platforms relative to an external reference frame (e.g. inertial reference frame) is considered here as the orientation angles with respect to its yaw, pitch, and roll rotation axes. These orientation angles are specific Euler Angles which are very often used in aerospace applications to define the relative orientation of a platform. It should be however understood that the principles of the present invention can be used for determining other platform orientation angles (such as Heading and Attitude) which are sometimes used to define a platform's orientations. In this connection it should be noted that the expressions longitudinal axis/direction and roll axis are used herein interchangeably to designate the same platform body axis. The yaw, pitch, and roll rotation axes are general geometrical parameters, not bound by specific definitions used in a particular technical field.

For clarity, in the present disclosure, directions, perpendicular to the platform's longitudinal/roll axis, are referred to herein as lateral directions. When not mentioned otherwise, the angular rotation rate (or angular rotation rate vector) refers to the total angular rotation of the platform comprising its angular rotation rates about its roll, pitch and yaws axes. The rotation rate in the lateral direction which is perpendicular to the platform's longitudinal/roll axis (i.e. comprising the platform's rotation rates about its pitch and yaw axes) is referred to herein interchangeably as the lateral rotation rate of the platform or as the lateral angular rotation rate or the lateral angular rate. The lateral rotation rate is the projection of the total angular rotation rate of the platform onto a plane perpendicular to the platform's longitudinal/roll axis. The direction of the lateral angular rotation rate of the platform, being the direction of the lateral rotation rate within the plain perpendicular to the longitudinal/roll axis, can be determined in accordance with the ratio between the platform's rotation rates about its pitch and yaw axes.

The inventors of the present invention found that during certain types of motion (i.e. predetermined dynamic motion) of an aerospace platform, it is often expected to acquire a rotation rate whose direction lies within a certain plane. In this connection the roll axis of the platform is selected according to the invention to be the axis of the platform which is perpendicular to that certain plane. Accordingly, the pitch and yaw axes of the platform are selected to lie within that certain plane. In this respect, the selection of the body axes of the platform (e.g. the roll, pitch and yaw rotation axes) should not be confused with other conventions (e.g. selecting the roll/longitudinal axis to point to the nominal direction of motion of the platform etc) according to which platform's body axes may be selected.

Accordingly, a predetermined dynamic motion (or movement) of a platform designates a motion of the platform during which the roll angle (i.e. the tilt angle of the aerospace with respect to its roll axis) can be obtained. A predetermined dynamic motion of a platform is also characterized in the direction (i.e. regardless of its absolute magnitude) of the lateral rotation rate vector of the platform or the direction of any time derivative thereof (e.g. the zero and/or first order derivatives thereof) being associated with (being typically perpendicular to) a certain known direction (e.g. to a certain ray) in the external reference frame.

According to the invention, during a predetermined dynamic motion of a platform, its roll orientation angle can be determined utilizing determination of the orientation angle of platform about one of its pitch and yaw axes with respect to the direction of the lateral rotation rate vector or with respect to the direction of one of its derivatives. Two examples of such predetermined dynamic motion corresponding respectively to the zero and first order time derivatives of the lateral rotation rate include the following situations: (1) the direction of the lateral rotation rate is perpendicular to the known direction in an external reference frame with respect to which the orientation of the platform is determined; and (2) the rate of change (first time derivative) of the lateral angular rotation rate is perpendicular to the known direction in the external reference frame.

In the latter case, a predetermined dynamic motion may result, for example, from a moment acting to rotate the platform about a direction which is perpendicular to the certain known direction in the reference frame and perpendicular to the longitudinal axis of the platform. At the onset of such torque moment, it affects the rate of change of the lateral angular rotation rate of the platform in a direction perpendicular to the certain known direction in the reference frame, and thus the direction of the rate of change of the lateral angular rotation rate can be used as a reference from which the platform's roll angle can be measured with respect to the reference frame. Hence, in this case, by measuring the rate of change of the lateral rotation rate of the platform and by knowing the onset time of the moment, the roll angle of the platform can be determined.

It should be noted that the invention provides for controlling the onset time of such a moment, for example in some cases the platform can be driven into predetermined dynamic motion, for example by driving the platform to low dynamic motion characterized by low maneuvering of the platform, in which its motion is mostly affected by external forces. In such cases, it is possible to controllably drive the platform into a predetermined dynamic motion and concurrently measure the rate of change of the platform's lateral rotation rate, thus obtaining a reference direction from which the platform's roll angle can be measured.

Alternatively or additionally such a predetermined dynamic motion may result from the action of such torque moment (i.e. perpendicular to certain known direction in the reference frame) for a sufficient period of time. In this case, after a sufficient period of time, during which the direction of the platform's lateral angular rotation rate gradually becomes perpendicular to said certain known direction, the aerospace platform's motion is a predetermined dynamic motion. This is because the lateral angular rotation rate of the platform prior to the action of the moment, decays (e.g. due to friction) with time, thus gradually becoming negligible with respect to the rotation rate acquired by the moment. Hence, in such cases where the predetermined dynamic motion is characterized by the lateral rotation rate of the platform being perpendicular to the certain known direction in the reference frame, the roll angle can be determined by measuring the direction of the lateral angular rotation rate of the platform (i.e. by measuring the platform rotation rate about the pitch and yaw axes) and utilizing the direction of the lateral angular rotation rate as a reference from which the roll angle can be determined.

The inventors of the present invention have also noted that during such predetermined dynamic motion the direction and/or the rate of change of the platform's rotation rate has a non-zero component perpendicular to the certain body axis and that the non-zero component can be used as a reference to the platform's orientation about the certain body axis.

The present invention may utilize a reference frame external to the platform (e.g. inertial reference frame) for defining the orientation of platform with respect to the external reference frame. The axes of such external frames may for example be defined based on the direction of the gravity force and the local direction of the platform's trajectory (i.e. its velocity vector). The platform's orientation, with respect to the external reference frame, can be obtained by determining the angles between the external reference frame axes and the platform's body axes.

It should be noted that according to the invention, the platform's orientation (e.g. tilt) with respect to at least one of its body axes (being the certain axis above), which is referred to herein as the platform's longitudinal/roll axis, can be determined by measuring only those components of the angular rotation rate of the platform which are perpendicular to the longitudinal/roll axis.

Thus, a predetermined dynamic motion of an aerospace platform is obtained, for example, when the aerial platform is flown/driven into near ballistic movement (e.g. being a low dynamic motion) during which it is subjected to a gravity turn effect. The gravity turn effect exemplifies an external moment caused by aero-dynamical forces, which rotate the platform such that its longitudinal/roll axis coincides with the direction of its velocity vector. During such ballistic motion the velocity vector of the platform gradually turns towards the ground and, accordingly, due to the gravity turn effect, the platform's longitudinal/roll axis tracks a near parabolic path corresponding to a direction of the platform's velocity vector. Hence, the direction of the platform's lateral angular rotation rate, acquired due to the gravity turn effect, becomes perpendicular to both the longitudinal axis of the aerial platform and the direction of the gravity force (i.e. perpendicular to the local vertical direction in the inertial reference frame being the certain known direction in the external reference frame).

Accordingly, determination of the direction of the platform's rotation rate (at least the direction of the lateral rotation rate of the platform) with respect to the platform's body axes enables to obtain the platform's orientation about its longitudinal/roll axis (the roll angle). This is because the projection of either one of the platform's rotation rate and the change in the platform's rotation rate onto a plane perpendicular to the platform's roll axis, is in this case perpendicular to the vertical direction in the inertial reference frame. Thus, determining the direction with respect to the platform's body axes provides a reference with respect to which the tilt angle of the platform over its longitudinal axis can be measured/determined.

It should be noted that according to the invention, the platform's orientation (e.g. tilt) with respect to its longitudinal axis can be determined by measuring only the lateral components (e.g. the pitch and yaw) of the angular rotation rate of the platform. Accordingly, with the technique of the invention, it is sufficient to utilize measurement unit(s) providing the platform's angular rotation rates with respect to the two axes (e.g. pitch and yaw) perpendicular to said longitudinal/roll axis to determine the roll angle.

Generally, a gravity turn effect can be used for estimating the bias of the roll rate gyro (see U.S. Pat. No. 5,886,257). According to this technique, three rate gyros rigidly fixed to a ballistic body are used; the ballistic body revolves about its roll axis during its motion. The bias of the roll rate gyro is compensated by estimation of both the direction and the magnitude of the body's rotation rate due to a gravity turn effect (i.e. gravity turn rate). This is based on a mathematical calculation taking into account the body's orientation (e.g. pitch and yaw) and velocity.

However, according to this technique, the body orientation is measured by the rate gyros which might have a bias drift impairing the measurement accuracy. Estimation of the bias of the roll rate gyro is carried out by statistical filtering algorithms (such as recursive Kalman-filtering) using the estimated gravity turn rate and the roll angle determined by the roll rotation rate gyros. The present invention utilizes the predetermined dynamic motion to provide precise measurements of the roll angle of the platform.

It should be noted that during a predetermined dynamic motion, measurements of the direction of the platform's rotation with respect to the platform's body axes, provide an indication to the orientation of aerospace platform, at least with respect to one rotation axis (referred to herein as the longitudinal/roll axis) of the platform (typically other than the rotation axis with respect to which the measurements are taken). It should also be noted here that during the predetermined dynamic motion of the aerial platform, only the lateral components (perpendicular to the longitudinal axis) of the platform's angular rotation rate (or their time derivatives) are maintained to be in a certain correspondence with certain directions in the external reference frame. Accordingly, the magnitude of the platform's angular rotation rate in the longitudinal direction may acquire different values (substantial or negligible), and thus correspond to various flight conditions without departing from the predetermined dynamic motion of the platform.

In this respect, it should be understood that in some cases, where the platform's movement is characterized by revolution of the platform about its longitudinal axis (e.g. bullet's or missile's spin), a so-called yaw of repose effect affects the equilibrium yaw orientation of the platform. This means that the platform's longitudinal axis deviates from the direction of its velocity vector by a certain deviation angle which may be computed based on the platform's velocity, its revolution rate, etc. According to the present invention, an accurate determination of the platform's roll orientation can be obtained by utilizing the direction of the platform's rotation with respect to the platform's longitudinal axis and then utilizing said deviation angle to determine said direction with respect to the platform's velocity vector.

Another non-limiting example of a predetermined dynamic motion of an aerospace platform is given during the orbit of some satellites around the earth. Some types of satellites, such as communication satellites, are designed to maintain relatively constant attitude with respect to the planet around which they orbit. This is typically achieved by using a detection unit associated with the satellite for detecting the respective planet's direction (e.g. by measuring the planet's emission of electromagnetic radiation, thermal radiation, magnetic field, etc.). Constant attitude orientation of the satellite with respect to the planet's direction is maintained by utilizing internal means to rotate the satellite during its orbit and to reorient its direction toward the planet. Here, the longitudinal axis of the satellite platform is the axis that is maintained pointing in the planet's direction. The rotation rates of the satellite, which are orthogonal to both the satellite's longitudinal/roll axis and the orbital trajectory of the satellite about the planet, are adjusted in order to maintain the longitudinal axis pointing towards the direction of the planet. Thus, by measuring the direction of the satellite's rotation rates (particularly, the lateral rotation rate, the projection of the rate vector onto a plane orthogonal to the satellite's longitudinal/roll axis) with respect to the satellite pitch and yaw axes, it is possible to determine the satellite's roll angle (i.e. its tilt about its longitudinal/roll axis with respect to the trajectory of its orbit). It should be noted that also in this example, determination of the platform's (satellite) roll angle is obtained utilizing only measurements of its rotation rates about the axes perpendicular to its longitudinal/roll axis. Accordingly the predetermined dynamic motion of the platform might be characterized by any arbitrary rotation/revolution of the platform about its longitudinal axis.

Measurements of a lateral direction (i.e. within a plan orthogonal to the roll axis) of the platform rotation rate may be carried out by the use of two rotation rate sensors (rate gyros) perpendicular to its longitudinal axis. According to the present invention, it is possible to utilize rate gyros having relatively high bias drift rates to accurately measure this direction. Although the high drift rates might impair the accuracy of determination of the magnitude of the platform's rotation rate, it is however possible to accurately determine the direction of the platform's rotation rate. This might be achieved by arranging the rotation rate sensors associated with the pitch and yaw rotation axes to revolve about an axis substantially perpendicular to the platforms pitch and yaw rotation axes (e.g. revolving about the platform's longitudinal axis). Such an arrangement ensures that each of the sensors measures the platform's rotation rate about an axis (being a linear combination of pitch and yaw axes) which rotates about said longitudinal axis while being kept substantially perpendicular to the longitudinal axis. Thus, each of the sensors alternately measures the platform's rotation rate with respect to the platform's pitch and yaw axes. Accordingly the measured data provided by each of said rotation rate sensors is indicative of a modulation, with the sensor's revolution frequency, of the component of the platform's rotation rate perpendicular to the longitudinal axis.

According to one example, considering an ideal rotation rate sensor (with no bias drift effect) having a measurement axis (for measurement of the platform's rotation with respect to this axis) perpendicular to the platform's longitudinal axis and revolving thereabout with a relatively constant revolution rate $\omega$, a predetermined dynamic motion of the platform characterized by a constant rotation rate $\Omega$ of the platform about a direction perpendicular to said longitudinal axis would be measured as a sin wave signal $\Psi_0$ according to the following equation ($\Psi_0$ being the output from a rotation rate sensor revolving with rate $\omega$ about the longitudinal axis):

$$\Psi_0 \propto \Omega * \mathrm{Sin}(\omega * t + \phi)$$

Such a predetermined dynamic motion might be obtained during the orbit of a satellite while its longitudinal axis is directed towards the planet as exemplified above. The signal oscillates symmetrically about zero and has an amplitude proportional to the magnitude of the platform's rotation rate $\Omega$ and phase $\phi$ proportional to the direction of the platform's rotation rate with respect to its longitudinal axis, the frequency of the sin wave oscillation being the sensor's revolution rate $\omega$.

Measurements of the platform's rotation rate $\Psi$ by a non-ideal rotation rate sensor (having a significant bias drift error) would typically provide data indicative of the platform's rotation rate as described above ($\Psi_0$) with an addition of a relatively constant bias drift error $\epsilon$, and noise n. Thus:

$$\Psi = \Psi_0 + \epsilon + n$$

The bias drift error $\epsilon$ is not modulated by the sensor's revolution, since it is associated with the sensor itself and not with the direction to which it is pointing (which changes during its revolution). Thus, in this case, the modulation of the measured data caused by the sensor's revolution would not affect any modulation of the constant bias drift error of the sensor, and hence the measurement data obtained from the sensor might be filtered (e.g. by band-pass filter) to suppress the contribution of the sensor's bias error $\epsilon$. Accordingly, after suppression of the bias error, the measured data can be demodulated according to the sensors revolution rate, obtaining thereby an accurate signal $\Psi_0$ associated with the platform's rotation rate. After acquiring $\Psi_0$, the initial roll angle can be extracted from the phase $\phi$ (e.g. the initial roll angle may be represented by the phase $\phi$).

Generally, it might be sufficient to utilize a single revolving rotation rate sensor to determine the direction of the platforms rotation rate within the plane spanned by the platform's pitch and yaw axes. Since the sensor revolves about the longitudinal axis, the measurement data thereby obtained includes time multiplexed measurements of the platforms rotation with respect to both the pitch and yaw axes. However, a single sensor provides, at any given time, measurement data relating only to the platform's rotation rate about a single direction. This might be sufficient to accurately determine the direction of the platform's rotation rate, provided that the time scale of the change in the direction of the platform's rotation rate is relatively long in comparison with the sensor's revolution time scale (1/revolution-frequency, which is associated with the time scale of the time multiplexing of the sensor's measured data). Thus, in order to determine the direction of the platform's rotation more precisely, it is preferable to utilize an arrangement of two rotation rate sensors revolving about said longitudinal axis. Such an arrangement would provide continuous data relating to the platform's rotation rates with respect to both the pitch axis and the yaw axis simultaneously.

The principles of the operation of each of the sensors and the analysis of the measured data obtained therefrom would remain in this case similar to those described above.

Hence according to one broad aspect of the present invention there is provided a method for use in determination of orientation of an aerospace platform with respect to a first rotation axis, the method comprising measuring a direction of a rotation rate vector of the aerospace platform within a lateral plane intersecting with the first rotation axis and analyzing the measured direction and determining an orientation angle of the aerospace platform about the first rotation axis. Measuring the direction of a rotation rate vector within the lateral plane includes:

a. providing a predetermined-dynamic state movement of the aerospace platform with respect to an external reference frame. The predetermined-dynamic state movement is characterized by that a certain direction, corresponding to the direction of the rotation rate of the platform in the lateral plane and/or corresponding to any time derivative of the rotation rate of the platform in the lateral plane, is associated with a certain known direction within the external reference frame, b. while the aerospace platform is said predetermined-dynamic state movement, determining the certain direction by measuring a direction of the rotation rate of the aerospace platform within the lateral plane by a sensor assembly mounted on the platform and comprising at least one rotation rate sensor, and generating measured data indicative thereof, c. determining an orientation of the platform with respect to the first axis by determining a relation between the certain direction and the known direction within the external reference frame.

According to some embodiments of the present invention, a gravity turn effect is utilized to determine the platform's orientation about the first axis (e.g. being the platforms longitudinal/roll axis). According to these embodiments the known direction within the external reference frame is the direction of the gravitational force acting on the aerospace platform. In this case, the relation between the known direction and the certain direction is that the gravity force direction is perpendicular to the certain direction which is a direction of the rotation rate of the aerospace platform within the lateral plane reaction (e.g. in this case the certain direction represents the projection of the platform's rotation rate vector onto a plane perpendicular to the platform's longitudinal/roll axis).

Alternatively according to some embodiments of the invention the system of the present invention is mounted on a geostationary satellite. In such cases the certain direction is associated with the motion of the geostationary satellite.

It should be understood that according to some embodiments, a time derivative (any order time derivative) of the platform rotation rates in the lateral plane are used to determine a certain direction having a relation with a known direction in the external reference frame. Such a time derivative may be for example the first-order derivative corresponding to the rate of change of the rotation rate of the platform within the lateral plane which may correspond to or might be provided by external moment acting on the aerospace platform.

According to some embodiments of the present invention at least one rotation rate sensor of the sensors assembly revolves, with respect to the external reference frame, about a revolution axis intersecting with the lateral plane. Accordingly the measured data is thereby modulated by an angular velocity ($\omega$) of the revolution of the at least one rotation rate sensor. Typically in these embodiments, analyzing the measured direction includes utilizing the angular velocity ($\omega$) to de-modulate the measured data and to determine the direction within the lateral plane. Then, the direction within the lateral plane is utilized for determining the orientation angle of the platform with respect to the first rotation axis. It should be noted that the angular velocity ($\omega$) of the revolution motion of the sensors may be obtained from an actuation unit affecting that revolution or it may be is determined from readout data from rotation rate sensor by determining/identifying prominent frequencies in the readout data corresponding to the revolution.

Revolving the at least one rotation rate sensors with the angular velocity ($\omega$) allows to reduce/suppress a bias effect of the sensor and to thereby increase the accuracy of the measurement provided by the sensor (e.g. the accuracy of measurement of the direction in the lateral plane). This is achieved by de-modulating the measured data from the revolving sensors and filtering out the contribution of its bias drift effect to thereby reduces/suppresses the bias drift and increase the measurement accuracy.

According to some embodiments of the invention, the first axis about which the orientation of the aerospace platform is determined is substantially perpendicular to the lateral plane. Also, the revolution axis about which the at least one sensor revolves may also be substantially perpendicular to the lateral plane.

According to some embodiments of the invention, the first rotation axis corresponds to a roll orientation axis of said aerospace platform, and the sensor assembly is configured and operable for measuring rotation rates of the platform about two rotation axes associated with pitch and yaw orientation axes of the aerospace platform.

According to some embodiments of the invention, the determined angle of orientation of the aerospace platform with respect to the first axis is further utilized to compensate a bias drift effect of an additional rotation rate sensor that is associated with measurement of a rotation rate of the aerospace platform about its first rotation axis.

According to the invention the sensor assembly may include two of the rotation rate sensors that are configured to measure the platform's rotation rates about two directions in the lateral plane to thereby enable determination of the platform's rotation rates about pitch and yaw rotation axes of the platform. Alternatively the sensor assembly may include a single rotation rate sensor that is configured to perform the revolution about a revolution axis and to thus consecutively measure the platform rotation rates about various directions in a lateral plane intersecting (e.g. perpendicular to) the first rotation axis of the platform (to the roll rotation axis). This may enable determination of the platform rotation rates about both the pitch and yaw rotation axes.

According to some embodiments of the invention the at least one rotation rate sensor is fixed with respect to the aerospace platform and revolution motion of the sensor about said revolution axis is obtained by a rotation of the aerospace platform about an axis substantially perpendicular to the lateral plane (substantially parallel to the platform's longitudinal/roll axis). For example, when a system according to the invention is mounted on a missile, revolution of the rotation rate sensors, measuring the platform's rotations in the lateral directions, is inherently obtained by the revolution of the missile about its longitudinal axis during its flight. In such cases, when the platform itself rotates/revolves, the longitudinal axis of the aerospace platform might deviate from its normal position (in the case of a missile, the longitudinal/roll axis is normally directed during flight in the direction of the missiles velocity) due to a yaw of repose effect associated with the rotation of the platform. Accordingly, compensation for the yaw of repose effect associated with the rotation of the aerospace is provided during the analysis of the measured data from the sensor.

Alternatively or additionally, according to some embodiments of the invention the at least one rotation rate sensor is mounted on the aerospace platform in a manner that enables a relative rotational motion between the at least one rotation rate sensor and the aerospace platform about an axis substantially perpendicular to the lateral plane. Revolution of the sensors about the revolution axis might be provided in such cases utilizing an actuation unit(s) to induce relative rotation between the sensor(s) and the platform.

According to another broad aspect of the present invention there is provided a measurement system for use in determining orientation of an aerospace platform with respect to a first rotation axis of the platform relative to an external reference frame. The measurement system includes a sensor assembly and a control system. The sensor assembly is mounted on the platform and includes at least one rotation rate sensor and is configured and operable for measuring the rotation rates of the aerospace platform within a lateral plane intersecting with (e.g. perpendicular to) the first rotation axis and for generating measured data indicative thereof. The control system is configured and operable for carrying out the following:

analyzing the measured data to determine a certain direction corresponding to at least one of a direction of the rotation rate of the platform in said lateral plane and a direction of any time derivative of the rotation rate of the platform in the lateral plane obtaining a relation between the certain direction and a known direction within the external reference frame; the relation corresponding to a predetermined-dynamic state movement of the platform with respect to the external reference frame; and utilizing the certain direction and the relation to determine the orientation angle of the platform with respect to the first rotation axis.

According to some embodiments of the invention the at least one rotation rate sensor revolves with respect to the external reference frame about a revolution axis intersecting with the lateral plane (e.g. perpendicular thereto). Accordingly the measured data is indicative of the rotation rates within the lateral plane of the aerospace platform modulated by an angular velocity ($\omega$) of the revolution of the at least one rotation rate sensor. In these embodiments the control unit includes a de-modulation module associated with the sensor assembly and is configured and operable for receiving and for utilizing the angular velocity ($\omega$) to analyze the measured data and to generate de-modulated data indicative of the direction of the rotation rate of the aerospace platform in the lateral plane. It should be noted that revolution of the sensor might be obtained via rotation of the aerospace platform itself and/or utilizing an actuation utility for actuating a rotation of the at least one rotation rate sensor with respect to the platform.

According to some embodiments of the invention the first rotation axis corresponds to a roll orientation axis of the aerospace platform (e.g. being also its longitudinal axis). Also the pitch and yaw axes lie in the lateral plane perpendicular to the roll/longitudinal axis of the platform.

The control unit typically includes an orientation determination module that is configured and operable for receiving data indicative of the direction of the rotation rate of the aerospace platform in the lateral plane (e.g. receiving the demodulated data from the de-modulation module) and for carrying out the following: processing the de-modulated data corresponding to a predetermined-dynamic state movement of the aerospace platform to determine the certain direction; obtaining a relation associating the certain direction with a known direction in the external reference frame; and determining the orientation angle of the platform with respect to the first rotation axis of the platform.

It should be noted that one or more of the rotation rate sensors of the sensor assembly may be a part of an Inertial Navigation System (INS). Also the control system may be an integral part of the aerospace platform. Alternatively or additionally one or more modules of the control system may be located on a ground station or on another aerospace platform in which case the control system may include a transceiver utility for transmitting signals corresponding to the measured data to the ground station or to another aerospace platform. The sensor assembly may be actuated for generation of the measured data in response to a signal from the control system.

According to some embodiments of the invention the control system includes a bias compensation module that is associated with a first rotation rate sensor that is adapted for measurement of rotation rates of the aerospace platform with respect to the first rotation axis. The bias compensation module is configured and operable for receiving the orientation angle of the platform with respect to the first rotation axis as determined according to the method of the invention and to use that angle for correcting a bias drift effect of the first rotation rate sensor.

According to some embodiments of the invention the sensor assembly is configured and operable for measuring rotation rates of the platform about two rotation axes associated with pitch and yaw orientation axes of the aerospace platform.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A and 1B exemplify the principles of the determination of platform's orientation according to the present invention, where FIG. 1A shows how these are implemented during a gravity turn motion of the aerospace platform; and FIG. 1B shows a similar illustration during a satellite's controlled motion;

DETAILED DESCRIPTION OF EXEMPLARY EMBODIMENTS

Figure 1A:
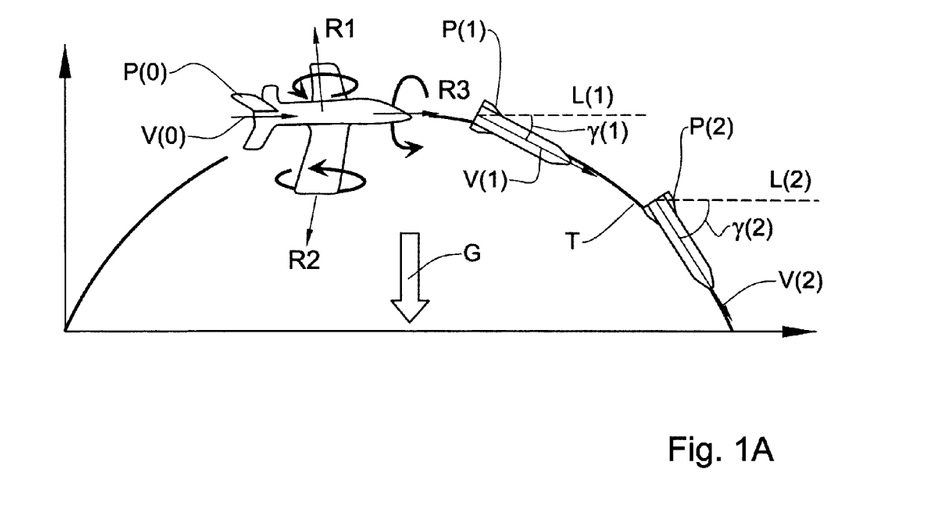
Figure 1B:
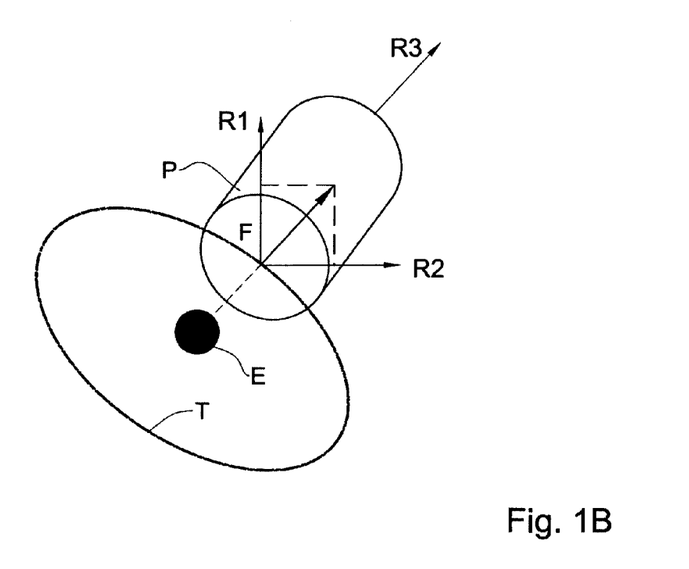

Reference is made now to FIGS. 1A and 1B, exemplifying the principles of the determination of a platform's orientation according to the present invention. FIG. 1A shows how these are implemented during a gravity turn motion of the aerospace platform; and FIG. 1B is a similar illustration during a satellite's controlled motion. To facilitate understanding, the same reference numbers are used to identify features common in all the examples described below.

FIG. 1A exemplifies the orientation determination technique of the present invention and how this is carried out during a ballistic motion of an aerial platform P (constituting an aerospace platform). Every stable airborne platform exhibits the gravity turn effect while in a free falling motion. The gravity turn effect acts on the aerial platform P, which moves along a ballistic trajectory T, affecting a predetermined dynamic motion of the platform. The predetermined dynamic motion, in this case, is characterized in that the platform's longitudinal/roll axis R3 and the velocity vector V coincide with (or at least approach) the direction of the ballistic flight trajectory T. Accordingly, the platform P acquires a lateral rotation rate (being the rotation of the platform perpendicular to the longitudinal axis R3; i.e. its rotation about the R1-Yaw and R2-pitch axes) perpendicular to the direction of the gravity force G. This is because during the effect of the gravity turn, the platform is subjected, at least for a certain period of time, to a moment caused by aero-dynamical forces which act to rotate the platform's longitudinal axis R3 in the direction of the flight trajectory T. The rotation rate of the platform, due to this effect, may be computed by a simple known physical equation, and the direction of the rotation is perpendicular to the plane determined by the gravity direction G and the platform's velocity vector (which is tangential to the fight-path T).

The platform P is shown at three sequential positions P(0), P(1) and P(2) along its path T. Due to the gravity turn effect, the longitudinal axis of the platform is kept aligned with the respective velocity vectors V(0), V(1), and V(2), while the platform's angle with respect to the horizontal plane changes throughout the flight trajectory T. This angle is marked in the figure by γ(1) and γ(2); the dashed lines L(1) and L(2) designate the horizontal plane at the respective positions. The rotation of the platform is in a direction perpendicular to its longitudinal axis R3 (which is also the roll rotation axis) and also perpendicular to the gravity direction G.

The effect of the platform's rotation rate acquired by the gravity turn effect can be measured with respect to the platform's body axes (R1, R2, R3), by rotation rate sensors (not shown) located on-board the platform. It should be understood that the gravity turn effect does not affect rotation of the platform in the longitudinal direction/axis (R3). This is because the torque applied to the platform by the gravity turn effect solely aligns the platform's longitudinal axis with its velocity vector. Accordingly, in order to determine the platform's rotation rates associated with the gravity turn effect, it is sufficient to measure the platform rotation rate with respect to the two axes perpendicular to the longitudinal axis R3 (e.g. R1-Yaw and R2-pitch axes).

Since the direction gravity vector G is known in an external reference frame (e.g. inertial) defined by the gravity vector G and the local flight path/trajectory T, it is then possible to determine the direction of the lateral angular rotation rate of the platform associated with the gravity turn effect with respect to the external reference frame (since that direction is perpendicular to both the gravity vector G and the flight path T). Hence, the orientation of the platform about its longitudinal/roll axis R3 can be determined with respect to the lateral rotation rate of the platform and/or with respect to its rate of change.

This is because from the onset of a ballistic motion of the platform, the lateral component of the rotation rate is forced, by the gravity turn effect, to be perpendicular to the vertical direction G in the external reference frame (being the certain known direction). Accordingly, the platform's roll angle can be determined by measuring the direction of the rate of change of the platform's lateral rotation rate after the onset of the gravity turn effect which "pushes" the platform towards a ballistic motion thus accelerating the lateral rotation rate perpendicularly to the vertical direction. Alternatively or additionally, after the onset of the gravity turn effect and when the platform's motion is ballistic, its lateral rotation rate is substantially perpendicular to the gravity direction and thus the platform's roll angle can be determined by measuring the direction of the platform's lateral rotation rate. In any of these cases, the direction of the lateral rotation rate and/or the direction of its rate of change can be measured from on-board the platform with respect to a local reference frame of the platform (e.g. by measuring the platform's rotation rate about the R1 and R2).

Thus, the direction of the platform's lateral rotation with respect to its pitch R2 and yaw R1 axes (e.g. corresponding to the ratio between the rotation rates about the pitch R2 axis and yaw R1 axes) can be determined/measured with respect to the first and second reference frames, the internal (local) reference frame defined by the body axes R1, R2 and R3, and the external reference frame (e.g. inertial frame) which is defined by the gravity vector G and the local direction of the flight trajectory T. Hence these reference frames are related to each other (constrained by the gravity turn effect) such that they share a common axis. In this example, such a common axis is the longitudinal axis R3 which is kept aligned with the local direction of flight trajectory T.

Referring now to FIG. 1B there is illustrated another example of the principles of the present invention and how these are carried out in an aerospace platform such as a satellite. A satellite platform P is shown being in an orbit trajectory T around a planet E. In this example, the motion of satellite P along its orbit T is a controlled predetermined dynamic motion adapted for maintaining the satellite's facet F (i.e. being perpendicular to its longitudinal axis R3) in the direction of the planet E. Such controlled predetermined motion is a typical motion of any geostationary satellites, for instance those serving communication purposes. To this end, the motion of the satellite P is characterized by a lateral rotation rate (i.e. perpendicular to the longitudinal axis R3) in a direction substantially perpendicular to the plane of the satellite's orbit T. Similar to the example of FIG. 1A, here the internal reference frame (associated with R1, R2 and R3 axes) of the satellite platform P and the external reference frame (associated with the local direction of the orbital trajectory T and the direction of the planet E) are constrained by the controlled movement of the satellite platform P, keeping the platform's longitudinal/roll axis R3 coinciding with the direction of the planet E. The controlled movement of the satellite along its trajectory is characterized by its lateral rotation rate being vertical to the plane of its orbit (e.g. operating to maintain the facet F in the direction of the planet or a particular angle with respect to the planet). Hence, in this example, similarly to the example of FIG. 1A, determining/measuring the direction of the satellite's lateral rotation rate provides a reference direction with respect to which the satellite's roll angle can be determined.

The direction of the lateral rotation rate with respect to the satellite's internal reference frame might be determined by measuring satellite's angular rotation I with respect to its Pitch (R2) and Yaw (R1) axes. Since with respect to the external reference frame the direction of the lateral rotation rate is expected to be in a direction perpendicular to both the local direction of trajectory T and to the direction of the planet E, it is possible to compare the measurements of the direction of the lateral rotation rate taken from on board the satellite platform with the direction of the lateral rotation rate with respect to the external reference frame and to thereby determine the orientation of the satellite platform about its longitudinal axis R3 relative to the plane of the satellite orbit trajectory T.

Figure 2:
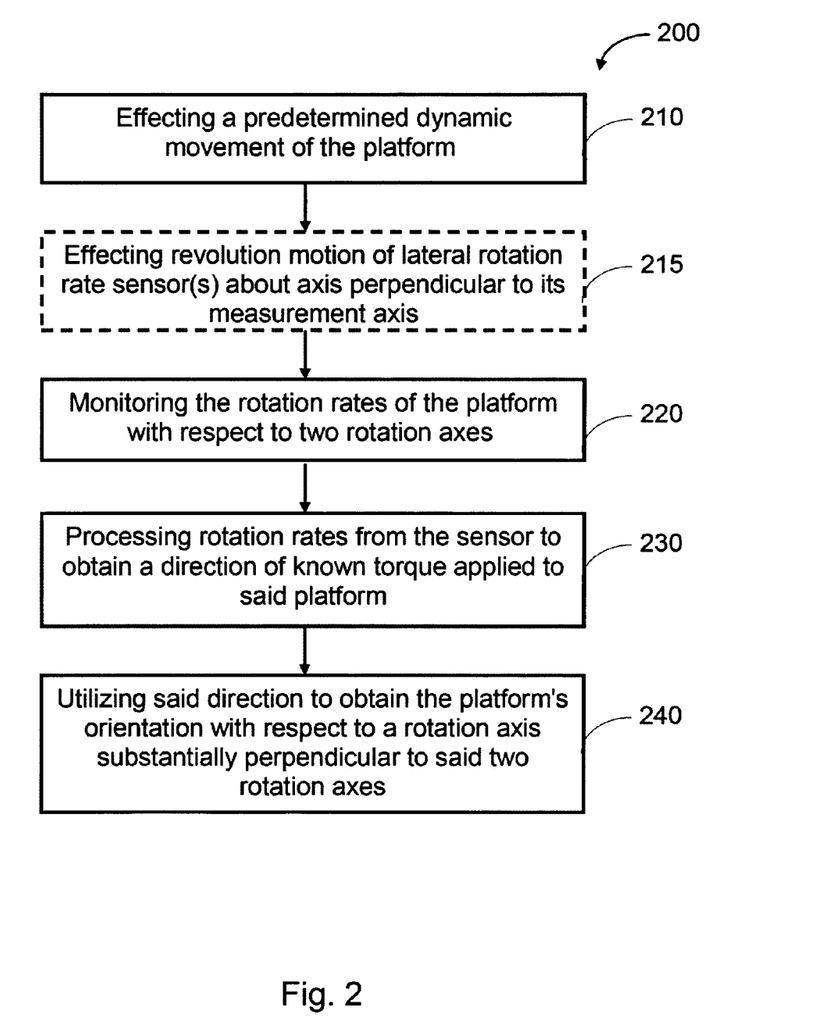
FIG. 2 is a flow diagram of an example of a method of the invention for determining the orientation of an aerospace platform.

Reference is made to FIG. 2, illustrating by way of a flow diagram 200 a method for determining the orientation of an aerospace platform according to an embodiment of the present invention. According to this method, the rotation rates of a platform with respect to the two rotation axes (e.g. the pitch and yaw axes) are measured, while the platform is in a predetermined-dynamic state movement characterized in that the platform's lateral rotation rate (or one of its time derivatives) is indicative of a known direction in an external reference frame with respect to which the platform's tilt about it's roll axis is to be determined (e.g. the direction of the lateral rotation rate is known to be perpendicular to the gravity direction in the external reference frame).

In step 210, the platform is driven into a state of predetermined dynamic motion. As noted above, this means basically that its motion is associated with a lateral rotation rate, the direction of which is indicative of certain directions in the external reference frame for example due to the gravity turn effect as indicated in FIG. 1A or due to the maintenance of a communication satellite which is pointing towards a planet while it orbits, as described with respect to FIG. 1B. Alternatively, in some cases, the platform is characterized in that the rate of change of the direction of its lateral rotation rate is indicative of certain directions in the external reference frame. For example, this may occur when an aerial platform's stirring units are neutralized and the platform is driven into a free fall movement during which the gravity turn effect affects its motion. In this case, at the onset of the free fall motion the one or more forces and/or moments (e.g. gravity-turn, gravity, aerodynamic effects, or self applied forces actuated by the platform itself) act on the platform and change the platform's lateral rotation rate in a known direction with respect to an external reference frame.

In should be noted that according to some embodiments of the present invention, the platform driving step 210 may be carried out automatically without any human intervention (such as the case may be in the example of FIG. 1B above). In some other embodiments, human intervention might be required in order to either initiate a predetermined dynamic state movement (e.g. an onset of a free-fall/ballistic movement) of the platform or indicate the times at which the platform is in such a state of movement.

It should also be noted that, optionally an induced additional rotation (termed here "revolution") of the lateral rotation rate sensors about a longitudinal axis can be used (step 215), in order to provide cancellation of the bias drift of the sensors, as will be described below. It should be understood that such revolution is actually a rotational movement of the lateral rotation rate sensor(s) about an arbitrary axis which is substantially parallel to the longitudinal axis of the platform; this is actually the movement of the principal measurement axis of the sensor(s). This might be needed when the rotation rate sensors in use have high bias drift rates, and when the predetermined motion of the aerospace platform is characterized by the direction of its lateral rotation rate (and not its time derivatives) perpendicular to the certain known direction in the reference frame. When the predetermined motion of the aerospace platform is characterized by any time derivative of the lateral rotation rate, this time derivative may be less affected by the bias drift than the direction of the lateral rotation rate. Thus, utilizing the revolution of the sensors might be obviated.

During a period of predetermined dynamic state motion of the platform a measurement of the platform rotation rates (indicative of either one of the direction of the platform's lateral rotation rate or the direction of the time-derivative (rate-of-change) of the platform's lateral rotation rate or both)) are taken (step 220). This may be achieved by utilizing on-board inertial measurement units, such as rate gyros, which may be a part of INS or AHRS systems typically employed on such platforms. According to the present invention, it is sufficient to determine the direction of the lateral rotation rate of the platform in order to determine the orientation of the platform with respect to a third longitudinal axis. To this end, determining the lateral rotation rates of the platform (or at least a ratio between them) about the two rotation axes perpendicular to the platform's longitudinal/roll axis, such as pitch and yaw axes, is sufficient. This can be achieved by utilizing two rotation rate sensors (gyros) for measuring the platform's rotation rates about two lateral directions (i.e. perpendicular to the platform's longitudinal/roll axis) or by utilizing a single rotation rate sensor revolving about an axis parallel to the platform's longitudinal/roll axis such that it alternately provides measurements of the platform's rotation rates about at least two such lateral directions.

Generally, in order to achieve an accurate measurement of the magnitude and direction of the platform's rotation rate, highly accurate rotation rate sensors might be required. However, according to the present invention, only the lateral direction of the rotation rate vector (the direction of the projection of the rotation rate vector on the plane perpendicular to the longitudinal axis) is needed to determine the orientation of the platform with respect to the third longitudinal axis. Thus, the invention allows for using less accurate sensors having relatively large bias drift effect. This is because the invention utilizes accurate determination of the direction of the platform's rotation rate by configuring the one or more rotation rate sensors (measuring the platform's lateral rotation rate's) to revolve about a third roll/longitudinal axis thereby providing modulation of the sensors' readings which facilitates the suppression or cancellation of the sensors' bias drift effect.

The bias drift of the rotation rate sensors can be considered as being relatively constant within the time scale in which the measurements are taken. In this case, the biased rotation rate measurement taken by each of the sensors contains contributions from two factors. The first factor is the rotation rate of the aerospace platform itself, modulated, due to the revolution of the sensors, by a sin wave having revolution frequency. The second factor is the relatively constant bias drift of the sensor which is not affected by the revolution of the sensor and is thus not modulated. Hence, after demodulating the measured rotation rates from the two sensors according to the revolution rate of the sensors, the relatively constant bias drifts are cancelled out and an accurate measurement of the direction of platform's rotation rate is obtained within the plane spanned by the axes associated with the sensors. To this end, this technique may be implemented also with rotation rate sensors having variable bias drifts (i.e. which cannot be regarded as constant during the platform's motion). In order to provide cancellation of the bias drift effect it is sufficient that the bias drift effect is relatively constant in the time scale of a period of the revolution of the rotation rate sensors. Thus the sensors' revolution rate might be adjusted accordingly in order to be in conformity with a relatively variable bias drift of the sensors.

It should be noted that although in the present example two rotation rate sensor's for measuring the platform's lateral rotation rates are described, according to the present invention one rotation rate sensor may be sufficient to determine the direction (and also the magnitude) of the platform's lateral rotation rates (e.g. associated with both the Pitch and the Yaw directions). This is because each sensor revolving about the longitudinal axis of the platform provides measurement data in the form of a modulated signal (modulated with the frequency of the sensor's revolution about the longitudinal axis) presenting time multiplexed data indicative of the platform lateral rotation rates. The time multiplexed data from a single revolving sensor can be processed to determine/resolve the platform's lateral rotation rates with respect to any two lateral axes (such as the platform's pitch and yaw axes). In this regard, the maximal time resolution of the platform's lateral rotation rates with respect to the two lateral axes is of the sensor's revolution frequency about the platform's longitudinal axis.

Figure 5A:
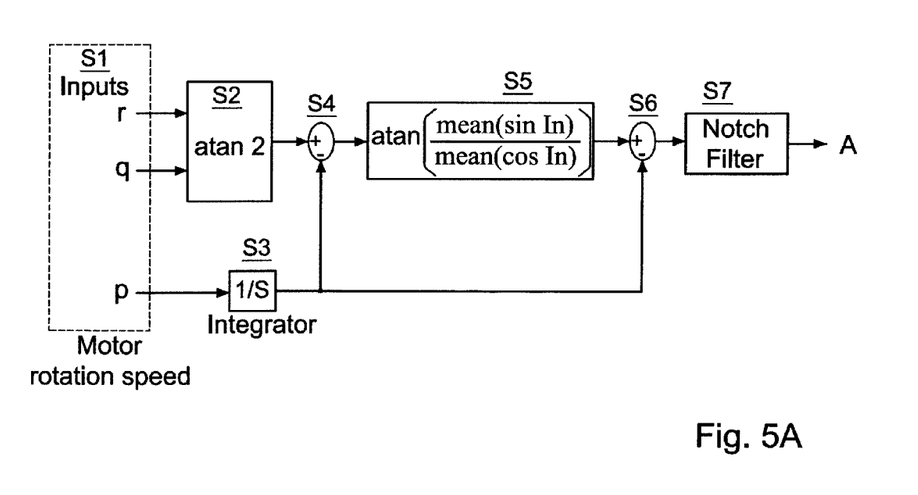
FIGS. 5A and 5B exemplify, by way of a block diagram (FIG. 5A) and graphically (FIG. 5B), an example of operation of a de-modulation module suitable to be used in the system of FIG. 3.
Figure 5B:
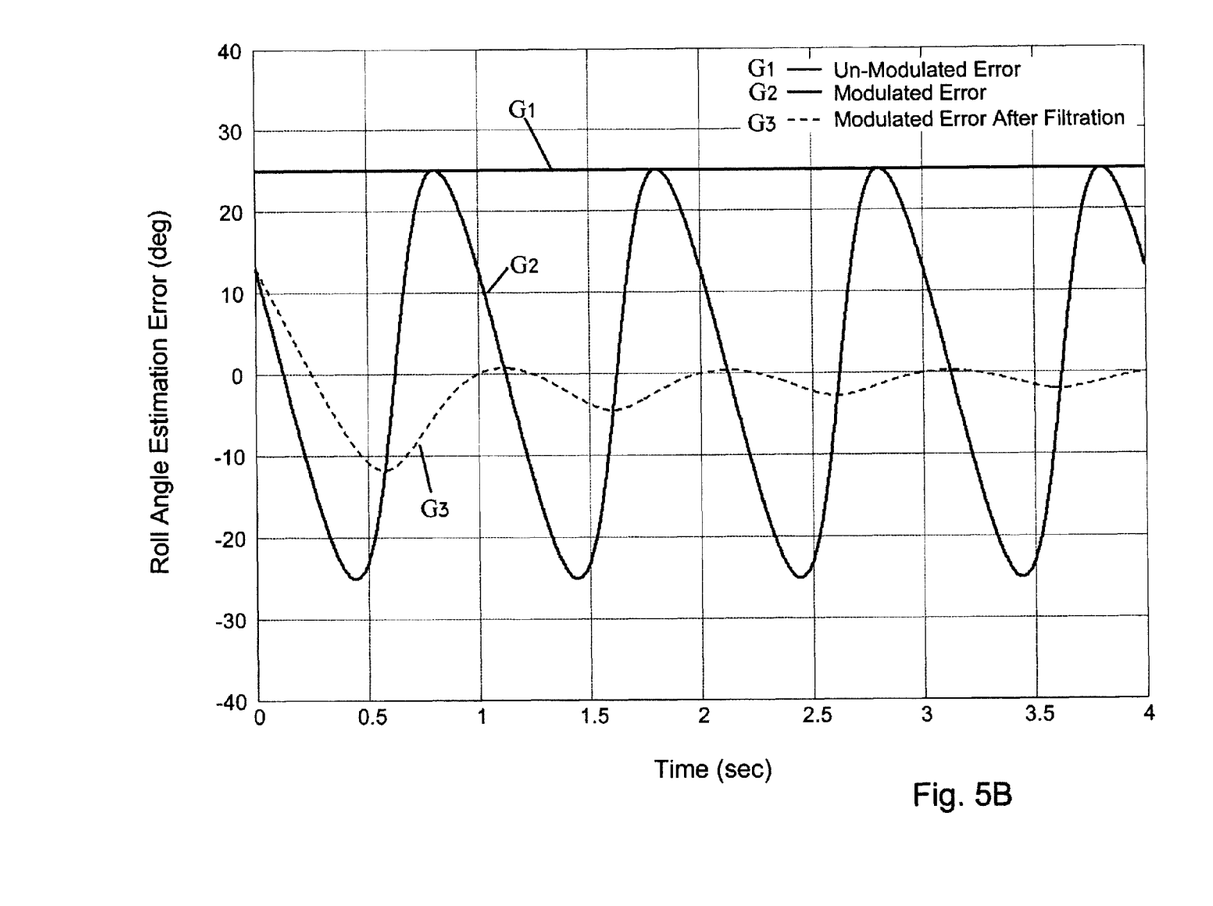

In step 230, the lateral rotation rates which are measured by the rotation rate sensors are processed, with respect to the frequency of revolution of the sensors about the third/longitudinal axis (or another axis parallel thereto) and in accordance with the orientation of the sensors relative to the platform's internal reference frame (e.g. the pitch and yaw axes of the platform). This processing is aimed at obtaining direction of the lateral rotation rate of the platform (i.e. the direction of the projection of the platform's rotation rate onto the plane spanned by two rotation axes of the platform). The processing analysis taking place at this stage will be further described below with respect to FIGS. 5A and 5B illustrating the analysis of revolving rotation rate sensors which may have a relatively high bias drift.

In step 240, the direction of the platform's lateral rotation rate and/or the direction of the time derivative of the lateral rotation rate is determined based on the measurements taken in step 230. The direction thus determined is in turn used to determine the platform's orientation/tilt about its longitudinal axis. As noted above, this is based on the fact that during certain predetermined dynamic motions of the platform, the direction of the lateral rotation rate is associated with (e.g. being perpendicular to) a known direction in the external reference frame. Alternatively, in certain other predetermined dynamic motions of the platform, the platform's lateral rotation rates are affected by the onset of a moment having a known direction in the external reference frame and thus in such cases the direction of the time derivative of the lateral rotation rate is used.

Thus in step 240, this direction of the platform's lateral rotation rate (the ratio between the rotation rate about its pitch and yaw axes) or the rate of change of this direction (being the time derivative of that ratio) is processed and used as a reference to indicate the angle of the platform's orientation with respect to the external reference frame relative to an axis substantially perpendicular to the two (lateral) axes associated with the rotation rate sensor(s).

Figure 3:
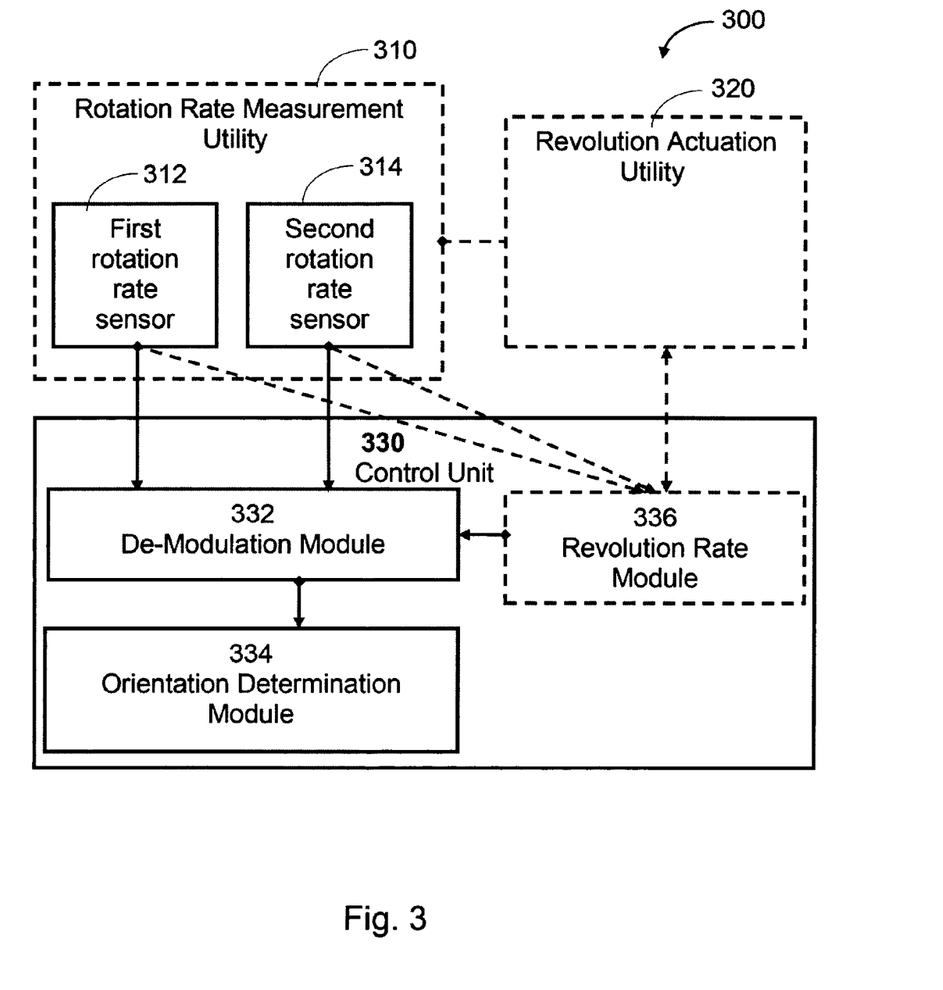
FIG. 3 is a block diagram of an example of a measurement system of the present invention for measuring the aerospace platform's orientation.

Referring to FIG. 3 there is illustrated, by a way of a block diagram, an embodiment of a measurement system 300 of the present invention. The system 300 includes a control unit 330 connectable (via wires or wireless signal transmission) to a rotation rate measurement device 310. It should be understood that the rotation rate measurement device 310 may be an integral part of the system 300 or a standalone device connectable with the control unit 330. A rotation rate measurement device 310 for use with the system of the present invention comprises one or more rotation rate sensors (Gyros), two such sensors 312 and 314 being shown in the present example, adapted to measure the aerospace platform rotation rate with respect to two independent rotation axes. Typically, two gyros are arranged along two perpendicular measurement axes for measuring the platform's rotation thereabout. However, such an arrangement is not necessary as the platform's rotation rates might be measured about two, non perpendicular, linearly independent axes.

In the present example, the invention utilizes controllably induced revolution of the sensors. As shown, the control unit 330 may be associated with a sensor revolution actuation utility 320 adapted to actuate revolution of the two rotation rate sensors 312 and 314 about an axis substantially perpendicular to both of their measurement axes. This provides modulation to the sensors' measured signal which enables, as will be further described below, to cancel out the measurement error introduced by bias drift of the sensors (gyros). It should be noted that the use of such controllably induced revolution of the sensors, as well as the use of such actuation utility, is optional. In some cases, as described above, rotation rate sensors 312 and 314 are relatively accurate (e.g. have negligible bias drift) and thus a revolution of the sensors which provides the modulation of the sensors' measured signal might not be required. In other cases, the aerospace platform itself is designed to revolve, during its movement (e.g. missiles), about an axis substantially perpendicular to the two rate sensors 312 and 314 measurement axes. In this case, the sensors' signal might be modulated by the platform's revolution.

The control unit 330 thus comprises a De-Modulation module 332, which is adapted to receive (from said rotation rate measurement utility 310) measured data from the sensors 312 and 314 and to analyze said data to determine the aerospace platform's rotation rates. As described above, the measured data obtained from the sensors 312 and 314 is modulated by the revolution of these sensors about an axis perpendicular thereto. Accordingly, the De-Modulation module 332 is configured to utilize the rate of revolution of the sensors in order to demodulate the measured rotation rates. The revolution rate might be of a fixed value (e.g. such as when a constant-rate actuation utility is used for the actuation of the sensors revolution) or it might vary (for example when the revolution of the sensors is based on the revolution of the platform itself about its longitudinal axis or when revolution actuation utility 320 induces a variable rate revolution).

In the latter case, in order to enable accurate de-modulation of the sensors signal, a Revolution Rate Module 336 is used to determine the revolution rate of the sensors. This can be achieved by having the Revolution Rate Module 336 connected to the revolution actuation utility 320 for controlling or receiving therefrom data indicative of the revolution rate of the sensors or by measuring the revolution rate by an additional rate gyro.

Alternatively or additionally, the Revolution Rate Module 336 may be connected to the rotation rate measurement utility 310 and adapted for receiving therefrom the sensors' measured data indicative of the modulation of the sensors' rotation rates. The revolution rate might then be determined, for example, by utilizing Fourier analysis of the measured data/signal itself to determine the dominant frequencies associated with the modulation of the signal.

After demodulation of the measured data, accurate (i.e. non-biased) demodulated data is obtained indicative of the platform's rotation rates with respect to the two rotation axes of the platform (e.g. pitch and yaw).

The data indicative of the platform's direction of rotation is further processed by an Orientation Determination Module 334 which is capable of determining the platform's orientation with respect to an external reference frame. As described above, this processing is based on the fact that the rotation rate of the platform is measured while the platform is maintained in a predetermined dynamic state movement. Therefore, measuring the direction of rotation rate of the platform with respect to its own (internal) body axes provides indication to a known direction within the external reference frame with respect to the platform's axes, thus enabling determination of the platform's orientation relative to the external reference frame.

Figure 4:
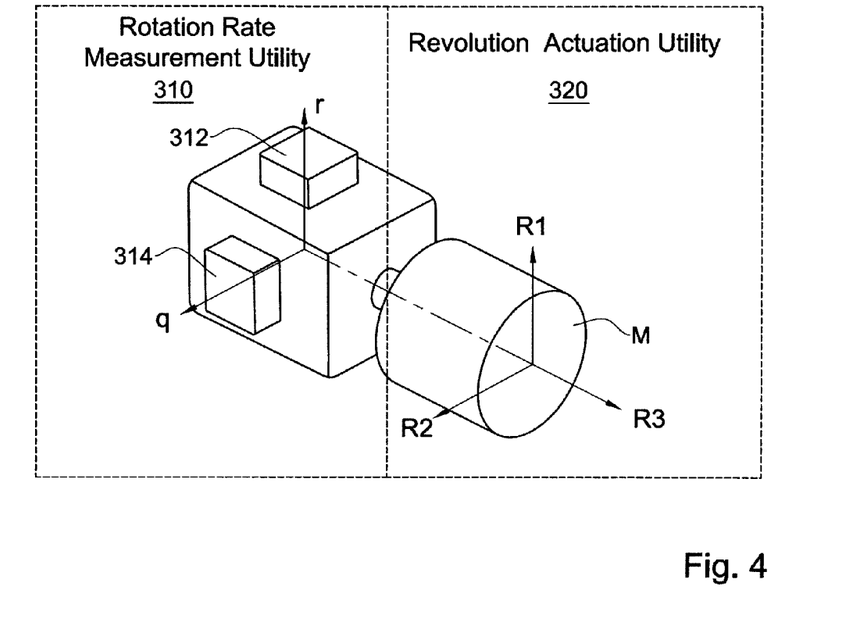
FIG. 4 exemplifies an assembly formed by a rotation rate measurement utility and a revolution actuation utility suitable to be used in the system of FIG. 3.

Reference is made to FIG. 4 showing schematically an assembly formed by rotation rate measurement utility 310 and revolution actuation utility 320 previously described with respect to FIG. 3. The reference numbers of the system elements and the platform's body axes (R1, R2 & R3) are consistent with those shown in FIGS. 2 and 3.

The rotation rate measurement utility 310 comprises two rotation rate Gyros 312 and 314 which are adapted to measure the platform's rotation rate with respect to two independent measurement axes r and q respectively. The rotation rate measurement utility 310 is operated by actuation utility 320 to revolve about an axis R3 (roll axis) which is substantially orthogonal to the measurement axes r and q. Consequently, the measurement of the platform's rotation rate with respect to the platform's body axes R1 and R2 (e.g. being the yaw and pitch axes) is modulated according to the revolution rate provided by the actuation utility 320.

It should be noted that in this example a motor M rolls the two gyros 312 and 314 about the platform's roll axis R3. It should however be understood that the revolution of the two gyros 312 and 314 about the platform's roll axis R3 might be provided by any other technique, for example a missile's natural roll rate without departing from the scope of the present invention.

In cases where the predetermined motion of the platform is characterized by the lateral angular rate of the platform being associated with a known direction in the external reference frame (e.g. being perpendicular to the direction of the gravity), the platform's roll angle with respect to the external (inertial) reference frame can be determined based on the on board measurements of the platform's lateral rotation rates (for example by measuring the platform's rotation rate with respect to the yaw R1 and pitch R2 axes), according to the following equation:

$$\phi = \text{ArcTan}(\dot{\phi}/\dot{\theta})$$

where $\phi$ is the Roll-angle and $\dot{\phi}$ and $\dot{\theta}$ are the rotation-rates about the yaw- and pitch-axes respectively.

In other cases where the predetermined dynamic motion of the platform is characterized by the onset of moment of known direction in the external reference frame, the equation is based on the time derivatives of the yaw and pitch rotation rates $\ddot{\phi}$ and $\ddot{\theta}$ as follows:

$$\phi = \text{ArcTan}(\ddot{\phi}/\ddot{\theta})$$

It should be noted that the time derivatives $\ddot{\phi}$, $\ddot{\theta}$ of the rotation rates about the yaw and pitch axes might be determined utilizing the measured rotation rates $\dot{\phi}$ and $\dot{\theta}$ obtained from the lateral rotation rate sensor(s) without being affected by the bias drift of the rotation rate sensors. This is because the time derivative of the rotation rates can be obtained by comparing two or more readouts from the sensors taken with small time lag between readouts relative to the timescale of the bias drift of the sensors. However, when utilizing the platform rotation rates $\dot{\phi}$ and $\dot{\theta}$ (and not their time derivatives) measured from yaw and pitch rotation rates sensors, and when large bias drifts, $B_1$ and $B_2$, are associated with a measurement of the platform's rotation rates with respect to these axes respectively, then a significant bias error is obtained when computing the platform's roll angle by the above described equation, as evident from the following:

$$\varphi \cong \text{ArcTan}\left(\frac{\dot{\phi} + B_1}{\dot{\theta} + B_2}\right)$$

The suggested technique deals with the challenge of measuring the platform's rotation rates about two axes r and q which revolve with respect to the platform's pitch and yaw axes. Accordingly, the measured signal includes a modulation-related term being modulation of the platform's rotation rates about the platform's pitch and yaw axes (with the revolution frequency being the frequency of modulation), and non-modulated error term associated with the bias drift of the measurement sensors. To this end, the non-modulated error might be filtered out from the measured data by utilizing a wide variety of filters, such as a Band-Pass Filter designed to leave the modulated frequencies (associated with the platform's rotation rate) in the measured data while removing the frequencies that are associated with the bias error.

The De-Modulation module 332 is designed to demodulate the data and to obtain the direction of the platform's rotation rates with respect to the plane perpendicular to its roll/longitudinal axis. As noted above, the demodulation process is designed to suppress bias drift effects which are inherent to most of the existing rotation rate sensors. Referring now to FIGS. 5A and 5B there is illustrated, in the form of a block diagram (FIG. 5A) and graphically (FIG. 5B), an example of operation of a de-modulation module (332 in FIG. 3) for data processing and filtering according to an embodiment of the present invention.

As described above with reference to FIG. 3, the De-Modulation module 332 receives as inputs the data indicative of modulation of the platform's rotation rates measured by sensors 312 and 314. As shown in FIG. 5A, input data ((1), (2) and (3)) indicative of the rotation rates with respect to the r and q axes is received (in step S1). Additional input data is data corresponding to the rate of revolution p of the sensors' measurement axes r and q about a longitudinal axis R3. This additional input actually presents the measured data modulation rate (e.g. which might be constant (hard coded), and/or may be provided by the Revolution Rate Module 336). In step S2, the angle of the platform's rotation rate is computed, with respect to the r and q axes, as inverse tangent between the ratios of the two gyros outputs. In step S3, the revolution rate p of the two gyros with respect to the platform's body axes is integrated to provide the relative angle between the body axes R1, R2 (yaw and pitch axes) and the measurement axes r and q. This relative angle is subtracted, in step S4, from the angle obtained in step S2 to thereby obtain an initial angle of the measured rotation rate with respect to the body axes R1 and R2. As shown, in step S5, a non-linear filter is used to remove the measurement error introduced by the bias drift of the sensors. This is achieved by taking the mean of the sin and cosine of the angle obtained in step S4. Since this angle contains contribution from the actual rotation rate of the platform (being non-modulated as a result of the de-modulation procedure) and contribution from the measurement error (modulated after the de-modulation), thus taking the mean of the sin and cosine of this angle (over periods longer than a revolution time [1/p]) averages out the error. In Step S6, the initial roll angle is reset in accordance with the roll angle determined in step S5; in step S7 frequency filtering is applied to the so-obtained roll angle to filter out the frequencies associated with the revolution rate. Thus, an inverse tangent of these mean values would result in the angle A of the platform's rotation rate with respect to the body axes R1 and R2 and with the bias error being significantly reduced, as shown in FIG. 5B.

FIG. 5B demonstrates the modulation and filtration process according to the technique described in FIG. 5A, showing the measurement error time variations. The aerospace platforms movement is characterized by a zero rotation rate with respect to the pitch R2 and yaw R1 body axes.

Graph G1 shows the bias drift error of the rotation rate gyro as a function of time. This is a substantially flat line corresponding to the bias drift being substantially constant in time when no modulation is applied (e.g. in cases where the platform/the rotation rate sensors do not rotate around the longitudinal axis). The bias drift error is actually included/accumulated in the signal obtained in step S2 designating the direction of the lateral rotation rate vector (its angle about the longitudinal axis) The large constant angle (about 25 deg') that is obtained is mainly due to the error associated with the bias drift effect of the two gyros of the rotation rate measurement utility.

Graph G2 shows the same bias drift error of the measured direction/angle of the lateral rotation rate vector of the platform as it is obtained in step S2 above after modulating the measured data by revolving the two lateral rotation rate sensors (gyros) with revolution rate (p) (i.e. with respect to the platform's body axes R2, R1). The bias measurement error is thus shown to be modulated with the revolution rate p.

G3 shows the results of the bias error filtration process as described in step S5 above. As can be seen, the bias measurement error diminishes significantly with time. The characteristic time for the bias error decay/suppression is dependent on the modulation factor, i.e. the revolution rate p, e.g. associated with the motor rotation speed. Higher revolution rate p means faster suppression of the bias error and higher convergence of the estimation of the platform's direction of rotation rate to the actual value.

Thus, the technique of the present invention provides for simple and precise determination of the angular orientation of an aerospace platform, enabling use of any rotation rate sensors, which need not be by themselves configured for precise measurements. The invention may utilize an effect of predetermined dynamic motion on aerospace platforms and/or induced revolution of the sensors.

Those skilled in the art will readily appreciate that various modifications and changes can be applied to the embodiments as hereinbefore described without departing from its scope defined in and by the appended claims.

The invention claimed is:

1. A method for use in determination of the orientation of an aerospace platform with respect to a roll rotation axis thereof, the method comprising:
   a. providing a predetermined-dynamic state movement of said aerospace platform with respect to an external reference frame, said predetermined-dynamic state movement being characterized in that a direction of lateral rotation rate of the platform within a lateral plane substantially orthogonal to the roll rotation axis, and/or of any time derivative of the lateral rotation rate, is substantially perpendicular to a reference direction within said external reference frame,
   b. while the aerospace platform is in said predetermined-dynamic state movement, measuring said direction of the lateral rotation rate and generating measured data indicative thereof,
   c. analyzing Said measured data indicative of the direction of the lateral rotation rate being substantially perpendicular to said reference direction, and determining an orientation angle of said aerospace platform with respect to said roll rotation axis.

2. The method of claim 1, wherein said predetermined-dynamic state movement is associated with a gravity-turn effect acting on said platform, and wherein said reference direction is a direction of gravity force.

3. The method of claim 1, wherein said measuring of the direction of the lateral rotation axis utilizes at least one rotation rate sensor revolving with respect to said external reference frame about a revolution axis substantially parallel to said roll rotation axis, said measured data being thereby modulated by an angular velocity ($\omega$) of the revolution motion of said at least one rotation rate sensor.

4. The method of claim 3, wherein said revolution motion is obtained by at least one of the following:
   i. a rotation of said aerospace platform about an axis substantially parallel to said roll axis; and
   ii. a relative rotational motion between said at least one rotation rate sensor and said aerospace platform about an axis substantially parallel to said roll axis.

5. The method of claim 4, wherein said revolution motion is at least partially obtained by the relative rotational motion between said at least one rotation rate sensor and said aerospace platform and wherein said analyzing of the measured data provides compensation for a yaw of repose effect associated with said rotation of said aerospace platform.

6. The method of claim 3, wherein said analyzing of the measured direction comprises determining angular velocity ($\omega$) by identifying prominent frequencies in readout data obtained from the at least one rotation rate sensor.

7. The method of claim 3, wherein said analyzing of the measured direction comprises utilizing said angular velocity ($\omega$) to de-modulate said measured data and to determine said direction within the lateral plane.

8. The method of claim 7, wherein in said de-modulate measured data, a bias effect of said at least one rotation rate sensors is suppressed due to said angular velocity ($\omega$), thereby increasing accuracy of the measurement of said direction of the rotation rate of the platform in the lateral plane.

9. The method of claim 1, comprising utilizing the angle of orientation of the aerospace platform with respect to the roll rotation axis to compensate a bias drift effect of an additional rotation rate sensor associated with measurement of a rotation rate of said aerospace platform with respect to said roll rotation axis.

10. The method of claim 1, wherein said at least one rotation rate sensor is configured in one of the following configurations:
    i. the at least one rotation rate sensor comprises at least two of the rotation rate sensors configured to measure the platform's rotation rates about two directions in the lateral plane;
    ii. the at least one rotation rate sensor comprises a single rotation rate sensor adapted to revolve about a revolution axis substantially parallel to said roll axis and to consecutively measure the platform rotation rates about various directions in said lateral plane;
    thereby enabling determination of the platform rotation rates about pitch and yaw rotation axes.

11. The method of claim 1, wherein said time derivative of the platform rotation rate is the first-order derivative corresponding to the rate of change of the rotation rate of the platform within the lateral plane.

12. A measurement system for use in determining orientation of an aerospace platform with respect to a roll rotation axis of the platform relative to an external reference frame, the measurement system comprising:
- a sensor assembly mounted on said platform and comprising at least one rotation rate sensor configured and operable for measuring the rotation rates of the aerospace platform within a lateral plane orthogonal to said roll rotation axis and for generating measured data indicative thereof; and
- a control system configured and operable for carrying out the following:
    - analyzing the measured data to determine a certain direction corresponding to a direction of a lateral rotation rate of the platform within said lateral plane and/or to a direction of any time derivative of said lateral rotation rate of the platform in said lateral plane;
    - obtaining a perpendicularity relation between said direction and a reference direction within said external reference frame; said relation corresponding to a predetermined dynamic state movement of the platform with respect to said external reference frame; and
    - utilizing said certain direction and said perpendicularity relation and determining an orientation angle of the platform with respect to said roll rotation axis.

13. The system of claim 12, wherein said predetermined-dynamic state movement is associated with a gravity-turn effect acting on said platform; and said reference direction is a direction of gravity force.

14. The system of claim 12, wherein said at least one rotation rate sensor revolves with respect to said external reference frame about a revolution axis substantially parallel to said roll rotation axis, said measured data being thereby indicative of the rotation rates within said lateral plane of the aerospace platform modulted by an angular velocity ($\omega$) of said revolution of the at least one rotation rate sensor.

15. The system of claim 12, wherein said sensor assembly comprises at least one of the following:
  i. at least one rotation rate sensor fixed with respect to said aerospace platform, and wherein said revolution of the least one rotation rate sensor is obtained by a rotation of said aerospace platform about said revolution axis;
  ii. an actuation utility connected to said at least one rotation rate sensor and configured and operable to provide a revolution of a relative angular velocity between said at least one rotation rate sensor and said aerospace platform about said revolution axis; and
  iii. at least two rotation rate sensors configured to measure the platform's rotation rates about two directions in the lateral plane.

16. The system of claim 12, wherein the control system comprises a de-modulation module associated with said sensor assembly and configured and operable for receiving and analyzing the measured data and to utilize said angular velocity ($\omega$) to generate de-modulated data indicative of said certain direction of the rotation rate of the aerospace platform.

17. The system of claim 16, wherein the de-modulation module is capable of determining said angular velocity ($\omega$) by identifying prominent frequencies in said measured data obtained from the at least one rotation rate sensor.

18. The system of claim 12, wherein at least one module of said control system is located on a ground station or on another aerospace platform, and wherein said control system comprises a transceiver utility for transmitting signals corresponding to said measured data to the ground station or to said another aerospace platform.

19. The system of claim 12, wherein said control system comprises:
- an orientation determination module adapted for operating, during said predetermined-dynamic state movement of the platform, and to determine said orientation angle of the platform with respect to said roll rotation axis based on said certain direction of the lateral rotation rate of the platform and said perpendicularity relation; and
- a bias compensation module associated with a roll rotation rate sensor, which is adapted for measurement of rotation rates of said aerospace platform with respect to said roll rotation axis, said bias compensation module being configured and operable for receiving said determined orientation angle of the platform with respect to said roll rotation axis and for correcting a bias drift effect of said first rotation rate sensor by utilizing said orientation angle.

20. The system of claim 12, wherein said sensor assembly is configured and operable for measuring rotation rates of said platform about two rotation axes associated with the pitch and yaw orientation axes of the aerospace platform.

* * * * *